(12) United States Patent
Greene

(10) Patent No.: US 7,082,769 B2
(45) Date of Patent: Aug. 1, 2006

(54) HELICOPTER TURBINE ENGINE PROTECTION SYSTEM

(75) Inventor: Leonard M. Greene, White Plains, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 0 days.

(21) Appl. No.: 11/050,668

(22) Filed: Feb. 7, 2005

(65) Prior Publication Data

US 2006/0080969 A1    Apr. 20, 2006

Related U.S. Application Data

(62) Division of application No. 10/659,334, filed on Sep. 11, 2003.

(51) Int. Cl.
*F02C 7/26* (2006.01)

(52) U.S. Cl. ....................................................... 60/778

(58) Field of Classification Search ............. 60/39.091, 60/39.53, 775, 778, 779, 786
See application file for complete search history.

(56) References Cited

U.S. PATENT DOCUMENTS

| 3,021,673 | A | * | 2/1962 | Mock .......................... 60/39.3 |
| 4,619,110 | A | | 10/1986 | Moore |
| 5,035,811 | A | | 7/1991 | Grondin et al. |
| 5,121,596 | A | | 6/1992 | Takehara et al. |
| 6,585,009 | B1 | | 7/2003 | Matthews et al. |
| 6,616,835 | B1 | | 9/2003 | Jensen |
| 2004/0025513 | A1 | * | 2/2004 | Walsh et al. ................... 60/775 |

* cited by examiner

*Primary Examiner*—Louis J. Casaregola
(74) *Attorney, Agent, or Firm*—Lowe Hauptman & Berner, LLP

(57) ABSTRACT

A helicopter having a helicopter turbine engine disposed therein includes an over-stress protection system. The over-stress protection system includes a computer for storing data and an input such as a keyboard for inputting a safe temperature profile for starting the turbine engine. A temperature sensor is provided for measuring the actual turbine outlet temperature during the start up of the helicopter turbine engine. The actual engine temperature is then compared with the safe engine temperature profile and water and/or alcohol is injected into the engine when an actual temperature exceeds the safe temperature. The use of a ground based tank for use during start up and an airborne tank for in flight use are also disclosed.

5 Claims, 4 Drawing Sheets

HELICOPTER TURBINE ENGINE PROTECTION SYSTEM

This application is a division of U.S. application Ser. No. 10/659,334, filed on Sep. 11, 2003.

FIELD OF THE INVENTION

This invention relates to a helicopter turbine engine protection system and more particularly to a helicopter having a turbine engine protection system which injects water and/or alcohol into the engine when an over-stress condition is approached.

BACKGROUND FOR THE INVENTION

Helicopter's of the type having turbine engines typically include turbine outlet temperature monitors to avoid "hot starts." For example, it is well known that during the first few seconds of an engine start up procedure, the turbine outlet temperature will accelerate at a rapid rate. It is also well known to abort a start if either a maximum temperature, as for example 927° C. or an 810° C. to 927° C. maximum ten second transition limitation is about to be exceeded. It is also well known to operate helicopter engines below predetermined levels of turbine output temperature, torque and engine speed which are referred to herein as over-stress limits. Failure to operate within such limits may seriously damage an engine and/or lead to an engine failure.

One approach for starting a gas turbine of the type used for generating electric power is disclosed in the U.S. Pat. No. 5,121,596 of Takehara et al. As disclosed therein, a gas turbine is started while injecting a prescribed amount of moisture into a path for combustion gas from the start up of the gas turbine and the amount of moisture is varied dependent upon the feed quantity of fuel or the temperature of the combustion gas. In this way, the combustion temperature in the combustor or temperature variation rate on the surfaces of component parts in a gas path are approximately equal.

An additional U.S. Pat. No. 4,619,110 of Moore discloses a helicopter engine warning or control system which includes arrangements for sensing the engine temperature, the engine speed and the output torque from the engine. An audible warning is provided which may vary as the over-stress limits are approached. In addition, an arrangement may be provided for automatically injecting water or alcohol into the engine as an over-stress condition is approached.

It is now believed that there may be a commercial demand and need for an improved helicopter turbine engine protection system in accordance with the present invention. There should be a commercial demand and need for such methods and systems which are used during start up of a helicopter turbine engine to avoid "hot starts." In some cases the system will avoid the need to abort the start.

In addition, the improved systems in accordance with the present invention are also effective in avoiding an over-stress situation during flight operations.

BRIEF SUMMARY OF THE INVENTION

In essence, the present invention contemplates a helicopter turbine engine "hot start" prevention system. The system includes means for selecting a first preselected temperature which is below a critical temperature for the turbine outlet temperature and a ten second transient temperature range. Means such as a thermocouple are provided for detecting the turbine outlet temperature of the engine. The system includes a source of coolant such as water and/or alcohol for injection into the turbine engine as for example into a path for combustion gas. Means for injecting water and/or alcohol from the source into the engine when the turbine outlet temperature exceeds the first preselected temperature and means to abort the start up if the temperature fails to fall below the ten second transient temperature range are provided.

In a preferred embodiment of the invention, the system also includes means for detecting an over-stress condition during flight operations and means for injecting water and/or alcohol into the turbine engine in response to an over-stress condition.

A further embodiment of the invention contemplates a helicopter turbine engine over-stress protection system which includes a helicopter and a helicopter turbine engine mounted in the helicopter. An airborne tank for containing water and/or alcohol is also mounted in the helicopter as is an inlet for receiving water and/or alcohol from a ground source. The system also includes data storage means and means inputting a safe temperature profile for starting the turbine engine. Means for measuring the actual engine temperature profile during a start up procedure and comparison means for producing a signal when the actual engine temperature exceeds the safe engine temperature profile are also provided. The system in accordance with this embodiment of this invention also includes means for sensing at least one critical operating parameter such as engine temperature, output torque and engine speed during flight operations. A key function in this embodiment resides in means for injecting water and/or alcohol into a helicopter engine during a start up procedure while maintaining the airborne tank full of water and/or alcohol. In addition, the system includes means such as a quick connect-disconnect coupling for disconnecting the supply of water from the ground base source after completion of a start up procedure and means such as a pump for injecting a predetermined amount of water and/or alcohol from the airborne tank into the turbine engine in response to an over-stress condition during flight operations.

The invention will now be described in connection with the accompanying drawings wherein like reference numerals have been used to identity like parts.

DETAILED DESCRIPTION OF THE PREFERRED EMBODIMENTS OF THE INVENTION

Figure 1:
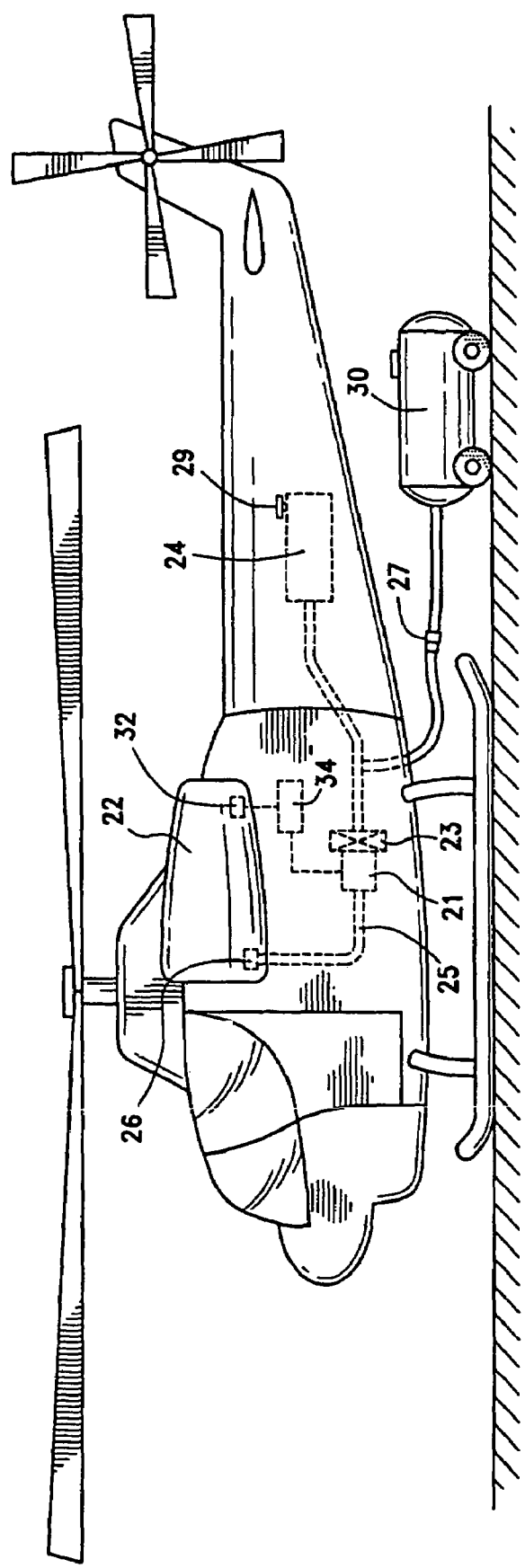
FIG. 1 is a side elevational view which shows a helicopter having an over-stress protection system in accordance with the present invention.

As illustrated in FIG. 1, a helicopter 20 having a turbine engine 22 mounted therein includes an over-stress protection system. In a first embodiment of the invention, the system is used to avoid "hot starts" i.e., an excessive engine temperature that could damage the engine during a start up of the engine. As shown in FIG. 1, the helicopter 20 also includes a tank 24 for containing a supply of water and/or alcohol.

The tank 24 is operatively connected to an injector 26 which is adapted to inject an engine coolant such as water and/or alcohol into the engine when the engine temperature exceeds a predetermined value or when the rate of temperature versus time exceeds a preselected value. The tank 24 is connected to the injector 26 by a conduit 25. A pump 21 and valve 23 are disposed along the conduit 25 for supplying a preselected amount of coolant from the tank 24 to the injector 26. The amount of coolant may be varied relative to the fuel flow and other varients.

In a second embodiment of the invention, a quick disconnect coupling 27 is provided in the conduit 25 between the tank 24 and injector 26. Means such as a ground based tank 30 is adapted to provide a supply of coolant during a start up procedure. In the alternative, a quick disconnect coupling 29 of conventional design may be provided in the tank 24. In either case, water and/or alcohol is provided to the injector 26 during a start up procedure while maintaining the airborne tank 24 full of coolant.

A sensor 32 such as a thermocouple is connected to a computer for measuring the turbine outlet temperature of the engine. Then when the turbine outlet temperature exceeds a predetermined value, the computer sends a signal to the pump 21 and/or valve 23 to feed a volume of coolant to the injector 26. The water and/or alcohol then cools the engine sufficiently to continue an engine start procedure. In cases where the turbine outlet temperature is not sufficiently reduced, the start up procedure is aborted by any suitable means not shown.

The use of a ground based tank 30 during a start up reduces the weight of the coolant in the tank 24 and allows a sufficient quantity of coolant for use during in flight operations when an unsafe temperature or critical parameters are approached or exceeded.

Figure 2:
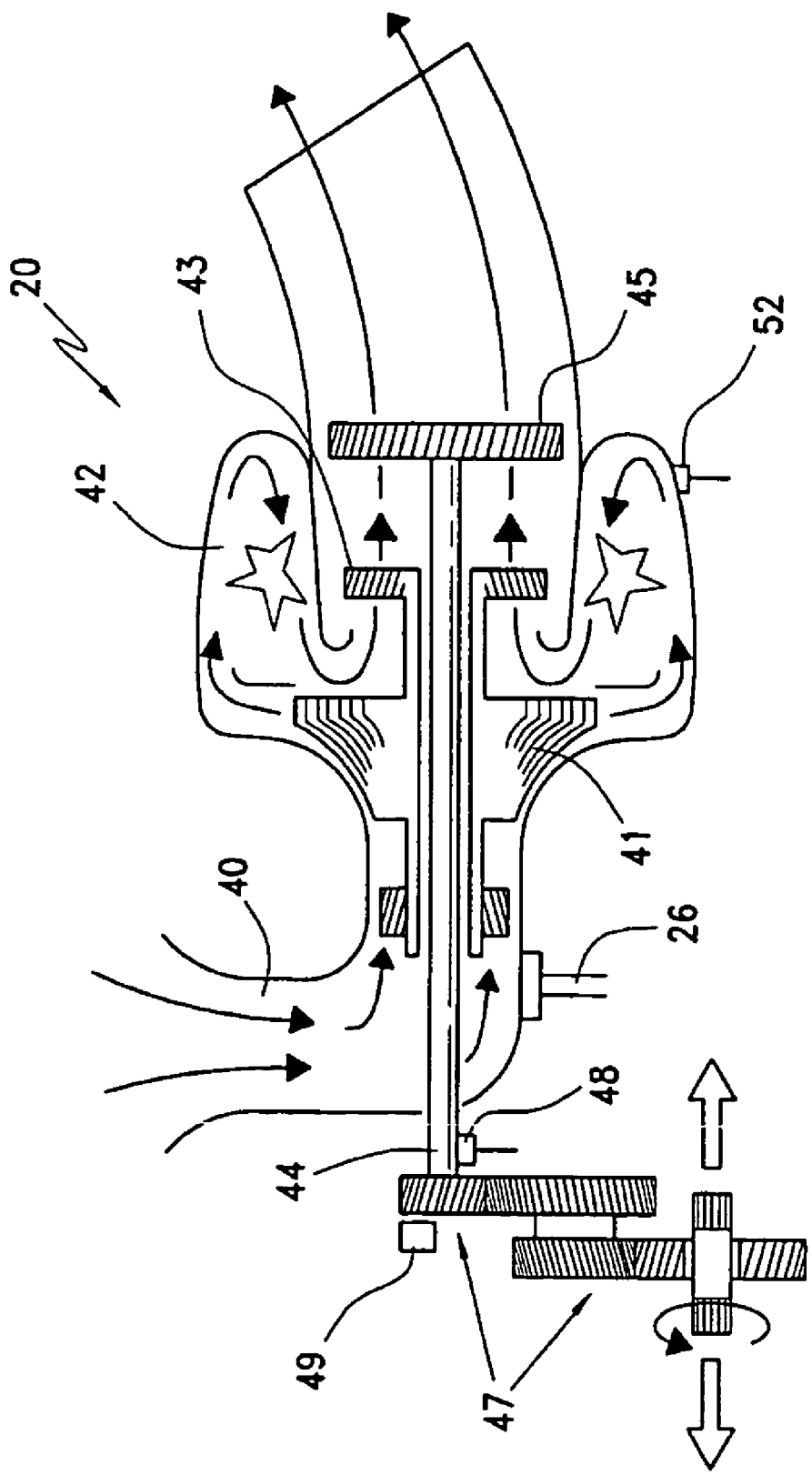
FIG. 2 is a schematic illustration of a helicopter turbine engine for use in practicing the present invention.

FIG. 2 is a schematic diagram of a turbine engine of the type typically used for powering helicopters but includes a turbine outlet temperature sensor 32 and injector 26 for injecting water and/or alcohol into the gas stream for cooling the engine and/or increasing power. As illustrated, air is supplied to the helicopter turbine engine 22 through an inlet duct 40 and is compressed in the compressor section 41. Fuel is supplied to the combustion chamber 42 which extends peripherally around the engine. The expanded gasses are supplied to the turbine portion 44 which drives the compressor 41 and then to power the turbine 45 which drives an output power shaft 44 to power the helicopter through a suitable gear train 47. A torque takeoff 48 of conventional design is provided for measuring actual torque during flight operations. A tacometer 49 is also provided for indicating engine speed. In addition, a temperature sensor 52 or thermocouple is provided for sensing turbine output temperatures.

Figure 3:
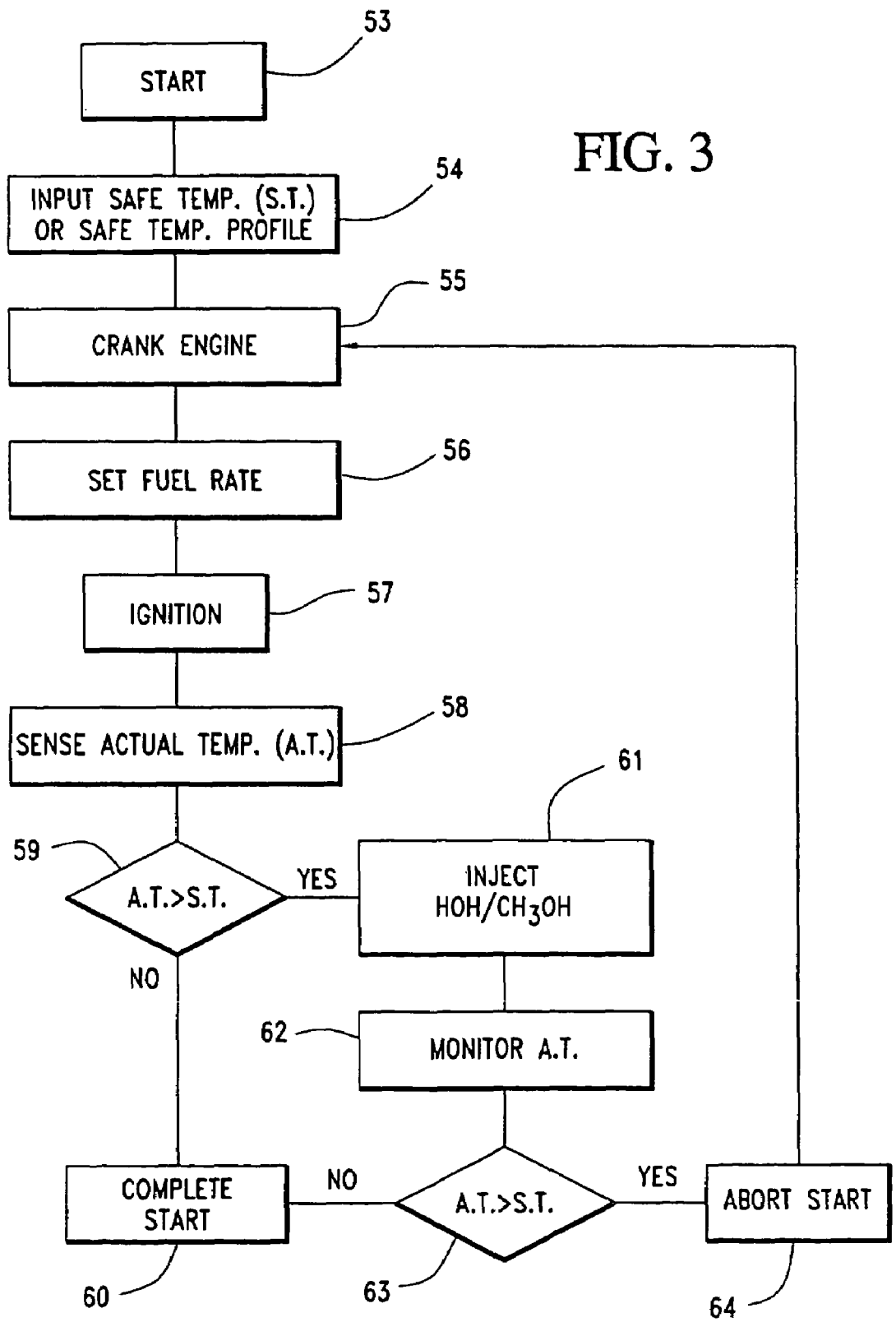
FIG. 3 is a block diagram which illustrates a method for avoiding "hot starts" in accordance with one embodiment of this invention.

FIG. 3 illustrates a method for avoiding "hot starts" in accordance with one embodiment of the invention. In conventional practice, the turbine outlet temperature is monitored to avoid a "hot start" which could seriously damage an engine. For example, a start up procedure for one specific engine is aborted if either the 927° C. maximum or the 810° C. to 927° C. maximum ten second transient limitation is about to be exceeded. Under such circumstances, the pilot depresses the engine idle rel. button, closes the throttle and continues to motor the starter until the turbine outlet temperature falls below 810° C.

In accordance with the present invention, a start 53 is initiated as provided in an FAA approved procedure. However, at the inception or more preferably before initiating a start up procedure, a safe temperature or safe temperature profile is inputted into a computer in step 54. Inputting a temperature profile may be used so that immediate action can be taken as soon as an actual temperature falls outside of the profile. It is also believed that the use of a temperature profile may be a more effective parameter which allows remedial action to be implemented earlier as the actual temperature approaches a dangerous condition.

After completing the FAA mandated prestart check list, the engine is cranked in step 55, fuel rate set in step 56 and ignition of the fuel in step 57. In step 58, the turbine outlet temperature is sensed and monitored. Then if the actual temperature does not exceed the safe temperature or fall outside of the temperature profile, the turbine engine is started as illustrated in step 60. However, if the actual temperature exceeds the safe temperature in step 59 or falls outside of the safe temperature profile, water, alcohol or a mixture thereof is injected into the engine in step 61. Following the water and/or alcohol injection, the actual temperature is monitored in step 62 until the turbine outlet temperature falls below a safe temperature limit as for example below 810° C. or falls back into the safe temperature profile. Then in step 63, if the actual temperature is below the safe temperature i.e., falls within the safe temperature profile, the starting procedure is completed. However, if in step 63 the actual temperature fails to fall below the safe temperature or lies outside the safe temperature profile, the starting procedure is aborted in step 64. Under such circumstances, the pilot presses the engine idle rel. button, closes the throttle and continues to crank the engine until the temperature falls below the safe temperature limit.

It is important to recognize that under ordinary conditions and a normal start, no water or alcohol is injected into the gas stream during the start up of the engine.

Figure 4:
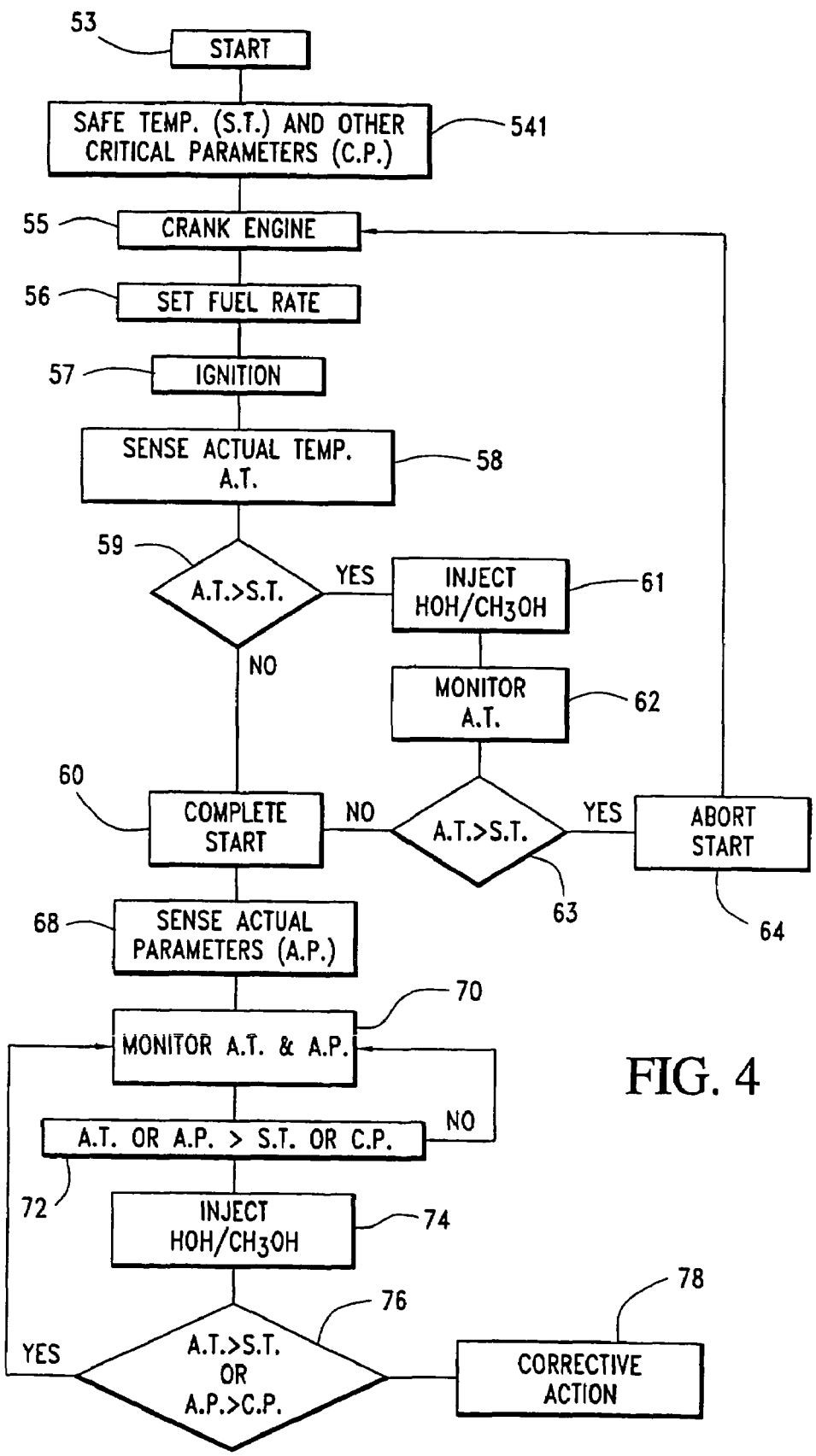
FIG. 4 is a block diagram which illustrates a further embodiment of the invention.

A further embodiment of the invention will now be described with reference to FIG. 4. As shown therein, the start up procedure is essentially the same as shown in FIG. 3. However, as shown in FIG. 4, a step 541 replaces step 54 and includes the input of other critical parameters (CP). For example, other parameters may include torque and/or engine speed. The start up procedure then continues until a start has been completed. Then if a ground based water tank was used, it is disconnected and flight operations commenced.

During flight operations actual turbine output temperature and other parameters are sensed in steps 68 and monitored in step 70. As long as the actual temperature does not exceed the safe temperature on the actual parameters do not exceed the critical parameters in step 72, the system reverts to the monitoring step as shown in step 70. However, if the safe temperature or critical parameters are exceeded, water and/or alcohol is injected from the airborne tank into the engine as indicated in step 74. In step 76, it is again determined whether or not the safe temperature or critical parameters are being exceeded. If not, the system recycles back to step 70 and the actual temperature and actual parameters are monitored. However, if the actual temperature or actual parameters are greater then the safe temperature or critical parameters, corrective action should be immediately taken as indicated in step 78.

While the invention has been described in connection with its preferred embodiments, it should be recognized the changes and modifications may be made therein without departing from the scope of the claims.

What is claimed is:

1. A method for protecting a helicopter turbine engine over-stress during startup and flight operations, said method comprising the steps of:
providing an airborne tank for containing a supply of water and/or alcohol and an inlet for receiving a supply of water and/or alcohol from a ground based source;
injecting water and/or alcohol into the helicopter turbine engine during a start up procedure while maintaining the airborne tank full of water and/or alcohol;
disconnecting the inlet from the ground based source of water after start up of the helicopter; and
injecting water and/or alcohol from the airborne tank into the helicopter turbine engine in response to an engine over-stress during flight operations.

2. A method for protecting a helicopter turbine engine against over-stress during start up and flight operations in accordance with claim 1 which includes the step of controlling the amount of water and/or alcohol injected into the helicopter turbine engine during the start up procedure.

3. A method for protecting a helicopter turbine engine against over-stress during start up and flight operations in accordance with claim 2 which includes the step of controlling the amount of water and/or alcohol injected into the helicopter turbine engine during flight operations.

4. A method for protecting a helicopter turbine engine against over-stress during start up and flight operations in accordance with claim 3 in which water and/or alcohol is injected in response to an increase in turbine outlet temperature.

5. A method for protecting a helicopter turbine engine against over-stress during start up and flight operations in accordance with claim 4 which includes the step of bypassing the airborne tank during an injection of water and/or alcohol during a start up procedure.

* * * * *